(12) United States Patent
Le Peuvedic

(10) Patent No.: US 8,015,273 B2
(45) Date of Patent: Sep. 6, 2011

(54) INFORMATION EXCHANGE SYSTEM

(75) Inventor: Jean-Marc Christian Le Peuvedic, Issy-les-Moulineaux (FR)

(73) Assignee: Dassault Aviation, Paris (FR)

( * ) Notice: Subject to any disclaimer, the term of this patent is extended or adjusted under 35 U.S.C. 154(b) by 881 days.

(21) Appl. No.: 10/980,831

(22) Filed: Nov. 4, 2004

(65) Prior Publication Data

US 2006/0030995 A1 Feb. 9, 2006

(30) Foreign Application Priority Data

Nov. 5, 2003 (FR) ...................................... 03 13022

(51) Int. Cl.
*G06F 15/16* (2006.01)
(52) U.S. Cl. ......... 709/223; 709/224; 709/226; 709/227
(58) Field of Classification Search .................... 709/224
See application file for complete search history.

(56) References Cited

U.S. PATENT DOCUMENTS

| | | | | |
|---|---|---|---|---|
| 4,671,593 A * | 6/1987 | Millon-Fremillon et al. | 439/326 |
| 4,972,470 A | 11/1990 | Farago | |
| 5,222,062 A * | 6/1993 | Sharma et al. | ................ 370/218 |
| 5,745,027 A | 4/1998 | Malville | |
| 6,976,105 B1 * | 12/2005 | Wright | ........................... 710/104 |
| 7,023,809 B1 * | 4/2006 | Rubinstein et al. | ............ 370/241 |
| 2002/0158765 A1 * | 10/2002 | Pape et al. | .................. 340/573.3 |
| 2003/0227392 A1 * | 12/2003 | Ebert et al. | ................ 340/825.49 |
| 2004/0010349 A1 * | 1/2004 | Perez et al. | .................... 700/287 |

FOREIGN PATENT DOCUMENTS

| | | |
|---|---|---|
| DE | 93 20 928 U | 6/1995 |
| EP | 0 436 458 A2 | 7/1991 |
| FR | 2 568 419 A1 | 1/1986 |
| FR | 2 812 453 A1 | 1/2002 |

OTHER PUBLICATIONS

Smith, "RIU-100/429 General Purpose Remote Interface Unit", Smiths Aerospace (technical notice).

* cited by examiner

*Primary Examiner* — Jeffrey Pwu
*Assistant Examiner* — Sulaiman Nooristany
(74) *Attorney, Agent, or Firm* — Jacobson Holman PLLC

(57) ABSTRACT

An information exchange system comprising at least one network for the transmission of information, at least one system computer accessing said at least one network, at least one peripheral device for exchanging said information with said at least one system computer, said at least one peripheral device being of sensor or actuator type and having no communication interface with said at least one network, at least one data concentrator associated with at least one associated peripheral device, accessing said at least one network and enabling said associated peripheral device to exchange said information with said at least one system computer, said data concentrator comprising data processing means, network interface means for interfacing said data processing means and said at least one network and device interface means for interfacing said data processing means and said at least one associated peripheral device, said information exchange system further comprising connection means for connecting said at least one associated peripheral device to said device interface means or said at least one network to said network interface means, said connection means comprising a connector, cable or connector accessory type connection element in which said data concentrator is incorporated in such a way as to be separable from said at least one associated peripheral device by disconnection from said connection element.

19 Claims, 4 Drawing Sheets

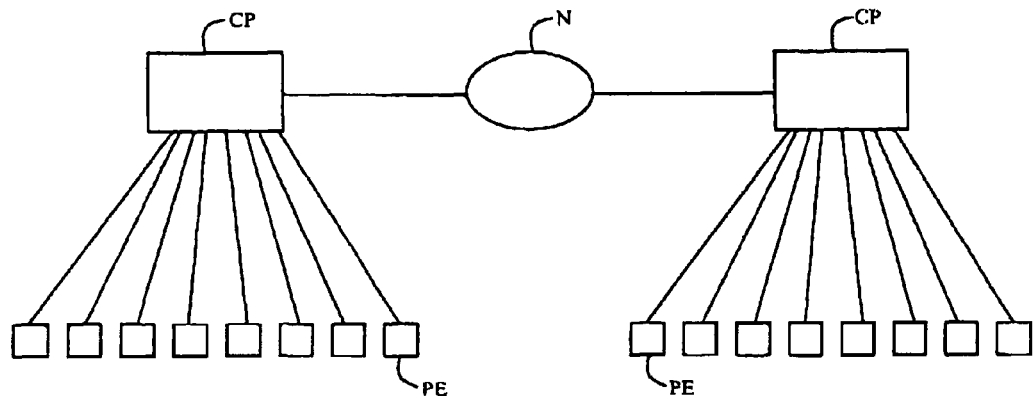
PRIOR ART  Fig. 1
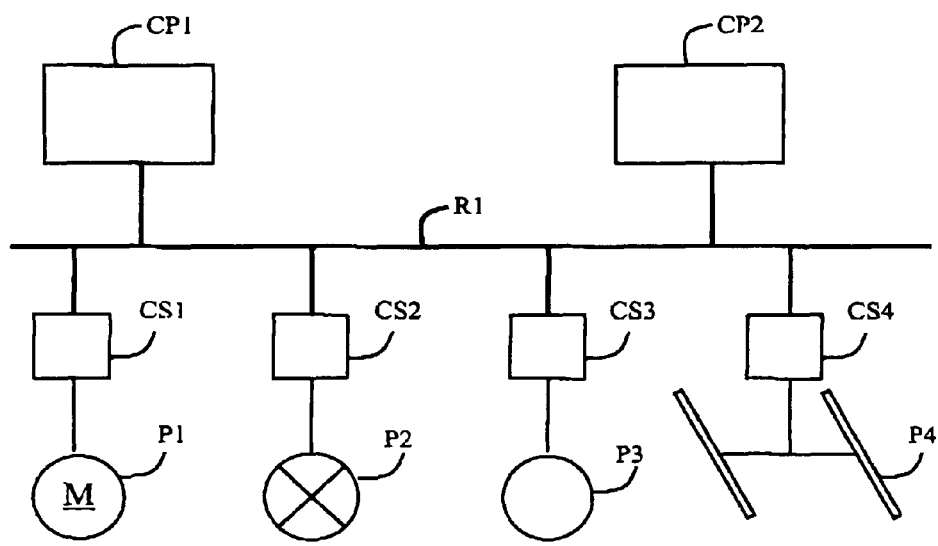
Fig. 2

INFORMATION EXCHANGE SYSTEM

BACKGROUND OF THE INVENTION

1. Field of the Invention

The invention relates to an information exchange system for use in particular in an aircraft.

2. Description of the Prior Art

Most airplanes, or more generally aircraft, carry complex systems, designed for example to control the fuel feed system or even for air conditioning, electricity generation and distribution or the management of hydraulic equipment, and which incorporate computers and a plurality of peripheral devices in the form of sensors and/or actuators exchanging with these computers the information needed to operate the system.

FIG. 1 diagrammatically represents an information exchange system known in the prior art and needed to operate a given complex system. This system comprises system computers CP which mainly comprise means of processing and/or storing the information used by the complex system. Each system computer CP is electrically linked to a plurality of peripheral devices PE with which it interacts. These peripheral devices can be, for example, in the case of an aircraft fuel feed control system, gauging probes placed in the fuel tanks or flow meters measuring the fuel flowrate through the fuel pipes. These system computers are furthermore interlinked by a network N, typically MIL-STD-1553 compliant, enabling them to exchange information.

The peripheral devices, which are in this example in the form of sensors or actuators, have an electrical interface for the transmission of information in the form of control or measure signals but do not have a communication interface with the network N. Each peripheral device is linked to at least one of the system computers by an electrical link for conveying the information between the computers and the peripheral devices, this link being provided by at least two wires, normally three or more, and as many as ten or so. This electrical link is conventionally provided by electrical wiring direct between the computers and the peripheral devices, typically in the form of octopus cables, which necessarily have connectors specific to each peripheral device. This solution has a number of drawbacks, including the need to provide a bulky octopus cable and a lack of standardization from one computer to another in processing information according to the type and number of peripheral devices with which the computer interacts.

Another known embodiment consists in combining the necessary hardware interfaces in a box separate from the computer. This solution has the advantage of reducing the complexity of the computer, but does not provide sufficient flexibility to handle all the different types of information and to be adapted to all architectures.

Also known are data collection units having a network interface on one side and a range of device interface means (around 100 to 200) on the other. These units do not, however, offer sufficient standardization in the device connections or in the modularity enabling them to be adapted, while limiting the volume of wiring, to all architectures, in particular those with a low number of peripheral devices concentrated in one place.

Also known, in the automobile sector in particular, is the use of intelligent sensors or actuators incorporating, in addition to the normal sensor or actuator functions, an interface module with a LAN type network (Local Area Network) using the CAN network technology. This technological solution does, however, culminate in intelligent sensors or actuators that use electronic circuit production technologies that are incompatible with the conditions of use on board an aircraft, particularly with regard to pressure conditions, temperature conditions that can range in certain parts of the aircraft from −55° C. to +115° C. and the significant vibrations generated by the mechanical environment. Finally, this solution would assume the production for each sensor or actuator of a specific model designed to be used on board an aircraft, which would lead to major development costs.

The object of the invention is therefore to overcome the drawbacks of the prior art solutions as described above and in particular to provide an information exchange system, suited to use in an aircraft, in particular by enabling the use of sensors or actuators which are suited to the use in an aircraft, which in particular reduces the volume of wiring needed to set it up, whatever the architecture to be implemented, while offering a better degree of standardization and/or modularity of the components used.

SUMMARY OF THE INVENTION

According to the invention there is provided an information exchange system comprising, at least one network for the transmission of information, at least one system computer accessing said at least one network, at least one peripheral device for exchanging said information with said at least one system computer, said at least one peripheral device being of sensor or actuator type and having no communication interface with said at least one network, at least one data concentrator associated with at least one associated peripheral device, accessing said at least one network and enabling said at least one associated peripheral device to exchange said information with said at least one system computer, said data concentrator comprising, data processing means, network interface means accessing said at least one network and for interfacing said data processing means and said at least one network, device interface means for interfacing said data processing means and said at least one associated peripheral device, said information exchange system further comprising connection means for connecting said at least one associated peripheral device to said device interface means or said at least one network to said network interface means, said connection means comprising a connector, cable or connector accessory type connection element in which said data concentrator is incorporated in such a way as to be separable from said at least one associated peripheral device by disconnection from said connection element.

According to the invention there is also provided a connection device for the exchange of information through at least one network between a system computer accessing said at least one network and at least one associated peripheral device having no communication interface with said at least one network, said at least one associated peripheral device being of sensor or actuator type, said connection device comprising a data concentrator, said data concentrator comprising, data processing means, network interface means accessing said at least one network and for interfacing said data processing means and said at least one network, device interface means for interfacing said data processing means and said at least one associated peripheral device, said connection device further comprising connection means for connecting said at least one associated peripheral device to said device interface means or said at least one network to said network interface means, said connection means comprising a connector, cable or connector accessory type connection element in which said data concentrator is incorporated in such a way as to be separable from said at least one associated peripheral device by disconnection from said connection element.

Data concentrator as used here means a device whose main function is to collect information from or to peripheral devices for the system computers.

The invention can be used to handle information exchanges between the peripheral devices and the system computers by means of said network and of data concentrators having an interface recognized by said network and therefore standardized.

The fact that the data concentrator is transferred to a wiring element associated with a peripheral device and incorporated in that wiring element means that the overall bulk of the system is reduced and makes the system very flexible and adaptable to all architectures. In practice, according to a particular embodiment, it is thus possible to provide a data concentrator for each peripheral device. The adaptability in relation to the number of peripheral devices to be connected is therefore in this embodiment maximized.

Because, compared to the known systems in the automobile sector with intelligent sensors or actuators, the network interface means for the peripheral devices are implemented by means of a data concentrator, easily separable from the associated peripheral device and therefore able to be produced independently of the peripheral device, it is possible to adapt the technology of the data concentrator for use in an aircraft, while the peripheral devices themselves (sensors or actuators) do not require any particular adaptation or form of implementation. It is also possible, because of this separate design of the concentrator and of the peripheral device, to standardize the data concentrators so that they can operate in all areas of the aircraft and with a wide range of peripheral devices, and this without having to adapt the existing peripheral devices. The result is a big saving in development and production costs.

Furthermore, the result is a solution which incorporates the known advantages of bus-based systems using intelligent sensors or actuators. This solution indeed provides all the advantages traditionally known for network or communication bus-based systems. Only the most important of these will be mentioned here, to whit: the capability for one and the same sensor/actuator to communicate with a plurality of computers simultaneously, without having to multiply the connections to the sensor/actuator; a high degree of flexibility and modularity for the system, since a peripheral device can be added or removed without affecting the network already in place; the possibility of synchronization or coordination between the different peripheral devices.

The network configuration, with the peripheral devices connected to the network via data concentrators, results in numerous other advantages for the system according to the invention, in particular the reduced volume and complexity of the wiring. Consequently, the installation and maintenance costs are necessarily reduced. Thus, whereas in a configuration with octopus cables comprising four system computers and approximately 80 peripheral devices per system computer, it was necessary to install hundreds of connecting wires between the peripheral devices and the system computer, because of the use of a network linking the peripheral devices to the network via the data concentrators, network wiring by two electrical wires (in the most advantageous embodiments) is sufficient according to the invention. If, for reasons of performance or security, it is preferred to have a plurality of networks, possibly redundant between themselves, the number of wires needed is multiplied by the number of networks required. However, even in this case, wiring volume is reduced by at least a factor of 10.

Furthermore, this new configuration of the information exchange system enables to reduce the number and/or the volume of the system computers since, because the peripheral devices are no longer connected directly to the system computers, there is no longer, compared to the octopus cable-based solutions, any physical constraint at computer level to limit the number of peripheral devices that can be connected to one and the same system computer. Finally, the additional volume required to install the data concentrators is still very small because these components can be incorporated in a connection element and are therefore sufficiently miniaturized for that.

The system or connection device according to the invention is appropriate to be implemented in an aircraft, or, more generally, in any vehicle.

The features and advantages of the invention will become apparent from the following detailed description when considered in conjunction with the accompanying drawings. It is intended that changes and modifications can be made to the described embodiment without departing from the true scope and spirit of the subject invention as defined in the claims.

BRIEF DESCRIPTION OF THE DRAWINGS

FIG. 1 diagrammatically represents an information exchange system known in the prior art and has already been described.

FIG. 2 diagrammatically represents the information exchange system according to the invention.

DETAILED DESCRIPTION OF THE PREFERRED EMBODIMENTS

Figure 3:
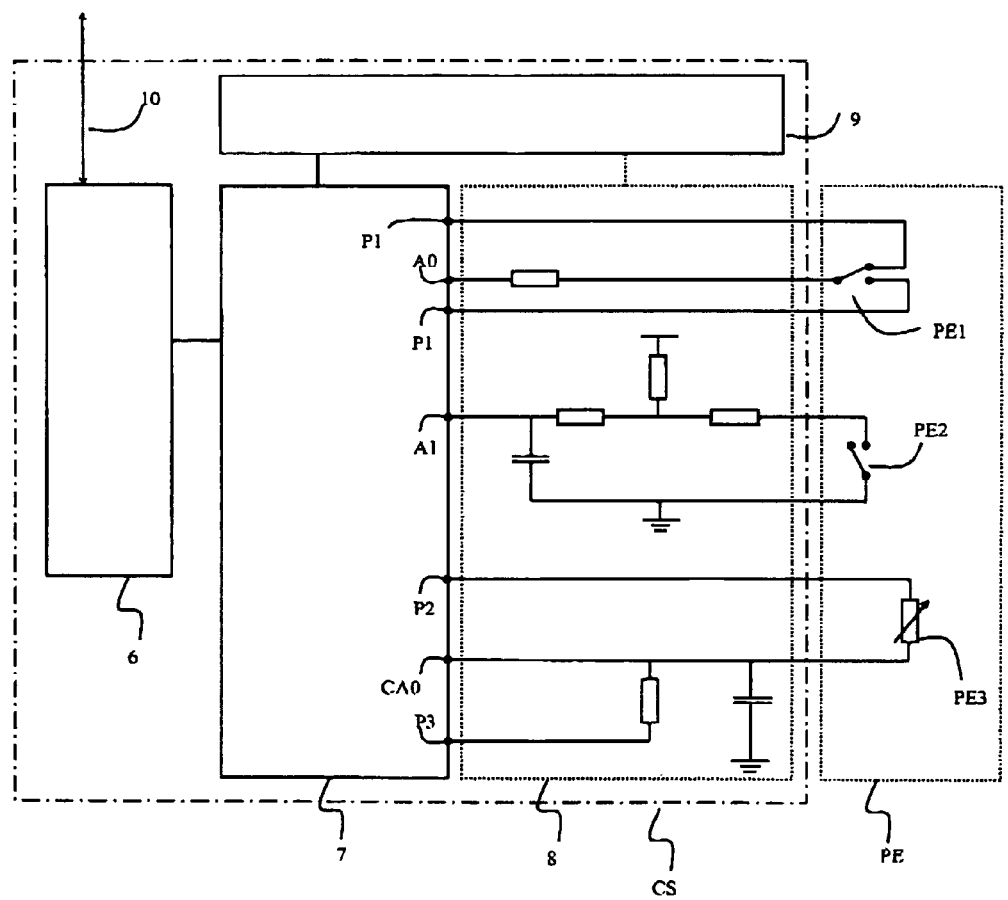
FIG. 3 diagrammatically represents a subassembly of the information exchange system according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIG. 2 is a schematic diagram of an information exchange system according to the invention. Such a system comprises at least one system computer CP1, CP2, and one or more peripheral devices for each system computer. These peripheral devices are either sensors sending information to the system computers, or actuators awaiting information and/or control commands from the system computers. They are, for example, a motor P1, a tap P2, a valve P3, a gauging probe P4 or a flowmeter.

The system according to the invention also comprises one or more data concentrators CS1, CS2, CS3, CS4. Each data concentrator is associated with at least one peripheral device. In FIG. 2, the data concentrator CS1, or CS2, CS3, CS4, respectively is linked to the peripheral device P1, or P2, P3, P4 respectively. Furthermore, each data concentrator CS1, CS2, CS3, CS4 accesses the network in the same way as the system computers CP1, CP2, that is, it is able in particular to exchange information via the network with the system computers, each data concentrator being capable of sending, or receiving, information to, or from, the network.

The information exchange between the system computers CP1, CP2 and the data concentrators CS1, CS2, CS3, CS4 is possible via a network R1.

In the case of an information exchange system applied to an aircraft, the network can be a network complying with the standard MIL-STD-1553. It must, in this case, include a physical transmission bearer in the form of two coaxial cables for each link. The standard MIL-STD-1553 is, however, very restrictive: the couplers connecting the computers to the bus are bulky and expensive, the nature and the topology of the network are limited to a single-bus architecture or to several interconnected single-bus architectures. Furthermore, the protocol as imposed in this bus standard allows only for the time-division multiplexing of the messages.

If the conditions of use allow, the network can be implemented using the CAN network technology and more often than not using twisted-pair wiring. This second bus type has the advantage of being more economical to implement and providing a saving in additional wiring volume since one twisted pair per network is sufficient.

In combination with the CAN technology, or independently of the use of the latter, it is possible to set up a network comprising means of transmitting information by bearer currents. This type of network can be used with any topology and offers a certain advantage in terms of reduced wiring volume, the electrical power supply wires being used to transmit the information in the network.

The information is processed digitally in the system computers and the data concentrators. The network used must therefore be a digital network in the sense that it must be capable of transmitting the information from one system computer to another or from one data concentrator to a system computer, and of restoring it accurately and in digital form for the system computer or the data concentrator to which it is addressed.

FIG. 3 shows a data concentrator CS comprising information processing means in the form of a microcontroller 7, means 6 of interfacing the microcontroller 7 with the network 10, means 8 of interfacing the microcontroller 7 with the associated peripheral device PE, and a power source 9. Each data concentrator thus, for the or each peripheral device to which it is linked, provides the interface function in relation to the network and its protocol, enabling the information sent by this peripheral device or intended for this peripheral device to be processed in a standardized and digital way. The information therefore passes in digital form through the microcontroller 7 which transcodes it and routes the information between, on the one hand, the interface means 8 in relation to the peripheral devices and, on the other hand, the interface means 6 in relation to the network. The function of the microcontroller 7 is therefore to manage and control these two types of interface means, the latter handling for the microcontroller 7 the hardware interface functions of the inputs/outputs of the microcontroller 7. The data concentrator CS is typically produced in the form of an integrated circuit.

It immediately follows from the above description, that one and the same peripheral device will be able to communicate with any system computer, without it being necessary to multiply the connections since all that is needed for this is to connect the associated data concentrator to the network linking the system computers. Furthermore, such a system can be used in a configuration in which the peripheral devices are required to intercommunicate in order, for example, to synchronize with each other.

The network interface 6 is an interface set up conventionally and its implementation depends on the type of network used. It is therefore not described in detail here. FIG. 3 gives exemplary embodiments of interface means that interface the microcontroller 7 to the peripheral devices. The microcontroller 7 has, according to the example in FIG. 3, digital inputs/outputs P0, P1, P2, P3, analog inputs/outputs A0, A1 and a comparator input CA0. It can be seen in this figure that the inputs P0, P1 and A0 are linked to a peripheral device via a toggle switch PE1, the input A1 to a peripheral device via a selector switch PE2 and the inputs P2, P3 and CA0 to a peripheral device via a potentiometer PE3. Still within the framework of the invention, one and the same peripheral device can thus include one or more means of interfacing with the microcontroller and a microcontroller can be interfaced with one or more peripheral devices.

Since the commonest basic device interface means are few in number (typically: toggle switch, selector switch, potentiometer, motor), a wide variety of peripheral devices is likely to be connected to one and the same data concentrator when this data concentrator comprises interface means including at least one example of each of the most common basic device interface means. A first possible degree of standardization of the data concentrator follows from this. The choice of the device interface means to be combined on one and the same data concentrator to obtain this standardization with a limited number of interface means, is based on practice and on the frequency of occurrence of the different combinations of these interface means. This choice also depends on the maximum volume possible or desired for a data concentrator and the maximum number of peripheral devices to be connected to it. In the context of this invention, the maximum number of peripheral devices that can be connected to a data concentrator will be very small, normally one or two peripheral devices, possibly three or four at most.

According to an advantageous embodiment of the invention, the data concentrators are miniaturized, while the peripheral devices (sensors or actuators) are produced in a standard manner or do not require a particular embodiment. This embodiment of the invention makes it particularly well suited to use in an aircraft where the space available for the devices is limited. Miniaturization of the data concentrators is possible with the use of electronic circuit miniaturization technologies known in the art, described for example in document FR 2 812 453 regarding the production of compact memory blocks or else in document FR 2 568 419 regarding the construction of high density connections in a reduced space.

The data concentrator is sufficiently miniaturized to be able to be incorporated in a connection element. This connection element is, for example, a cable connecting the peripheral device to the network, a connector connecting the peripheral device to the network, or even an accessory of such a connector. The data concentrator can also be easily separated from the or each peripheral device to which it is linked by simply disconnecting this connection element.

Figure 4:
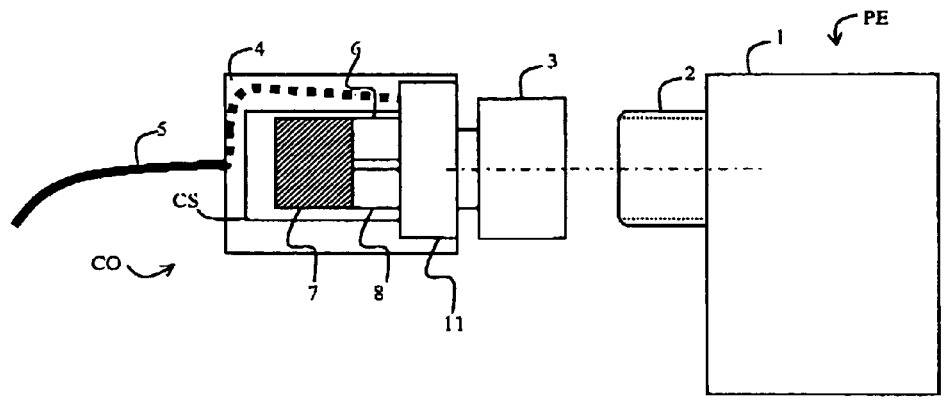
FIG. 4 diagrammatically represents an implementation detail of the connection means according to the invention.

FIG. 4 is a block diagram illustrating the way in which a connector CO is connected to a peripheral device PE when the data concentrator CS is incorporated in such a connector CO. The connector CO has a connector body 4 and a locking ring 3 fitting on the connection ring 2 fixed on the body 1 of the peripheral device PE. The data concentrator CS is miniaturized and incorporated in the connector body 4. It comprises a microcontroller 7 designed to process the information exchanged between the computers and the peripheral devices, device interface means 8 and network interface means 6. The connector CO partially incorporates a network connection cable 5 represented as a thick bold line, solid or broken for the part inside the connector CO. The microcontroller 7 is linked to the device interface means 8 enabling interfacing between the peripheral device PE and the microcontroller 7. The network interface means 6 enable interfacing between the microcontroller 7 and the network connection cable 5.

Such a connector CO also includes an interconnection element 11, produced, for example, in the form of a passive electronic component, defining the location and form of the interconnection contacts and providing, in addition to the electrical interconnection function between on the one hand the interfaces of the computer and on the other hand the network connection cable 5 and the peripheral device PE, the contact assignment and data concentrator configuration functions and even the function of identifying the data concentrator in relation to the network. The contacts are assigned, for example, by means of a passive matrix made up of conductive lines. The purpose of configuring the data concentrator is to configure electronically its device interface according to the peripheral devices connected to it. The data concentrator in relation to the network can in this case be identified according to the configuration of the interface of the concentrator and, if necessary, in combination with other means of identifying the data concentrator.

Through this interconnection element 11, enabling the assignment of the electrical contacts to be modified, a second level of standardization of the data concentrators is achieved, and the connectors as well as the data concentrators are made suitable for greater series production.

Thus, with one and the same connector, comprising a combination of given basic device interface means, having a given configuration of the data concentrator and a given assignment of the contacts of the interconnection element, it will be possible to connect a set of peripheral devices that are electrically interchangeable and compatible with this connector. Such an assembly is here called a peripheral device type. The peripheral device types can, for example, be defined as follows: potentiometers, plate probes, thermistors, tachometers, actuators, taps, valves, level sensors, pressure switches, etc. However, for one and the same connector, comprising a combination of given basic device interface means, when the configuration of the data concentrator and the assignment of the contacts of the interconnection element are varied, it will be possible to connect a wider range of peripheral devices, in this case called a peripheral device class.

In the embodiment with the configurable interconnection element, the data concentrators can all be identical from the hardware configuration point of view and can be interfaced with all types of peripheral devices, since they comprise the necessary basic device interface means. To interface such a data concentrator with a given type of peripheral device, the type being part of the peripheral device class that can be interfaced with this data concentrator, an assignment of the contacts of the interconnection element and a configuration of the data concentrator will be performed for this type of peripheral device.

From the software point of view, the data concentrators can be configured identically, since their software can then be adapted to all the combinations of device interface means that are connected to it. According to another variant, the software can also be customized for a class and even for a type of peripheral device by software download. In all cases, the software of the data concentrators will be independent of the use of the data exchange system to which it belongs. In practice, since the main function of the data concentrators is to collect information from or to peripheral devices for the system computers, this information will be processed and transmitted in the same way whether the system is dedicated to air conditioning, to electricity generation and distribution or to the management of hydraulic equipment.

The connector—or the cable—incorporating the data concentrator can be used to separate the data concentrator from the or each peripheral device that it interfaces by simply disconnecting this connector—or this cable. In a particularly advantageous manner, this connector will be made also in the form of a removable end fitting so as to facilitate the connection and/or the removal of the data connectors and cable testing. This embodiment also enables each connector to be adapted according to the type of peripheral device to which it is to be connected. Thus, only this removable end fitting has to be produced in different variants, the number of variants to be produced depending on the number of peripheral device classes to be implemented. In applications of the system according to the invention to an aircraft, the number of classes should be between two and four.

Figure 6:
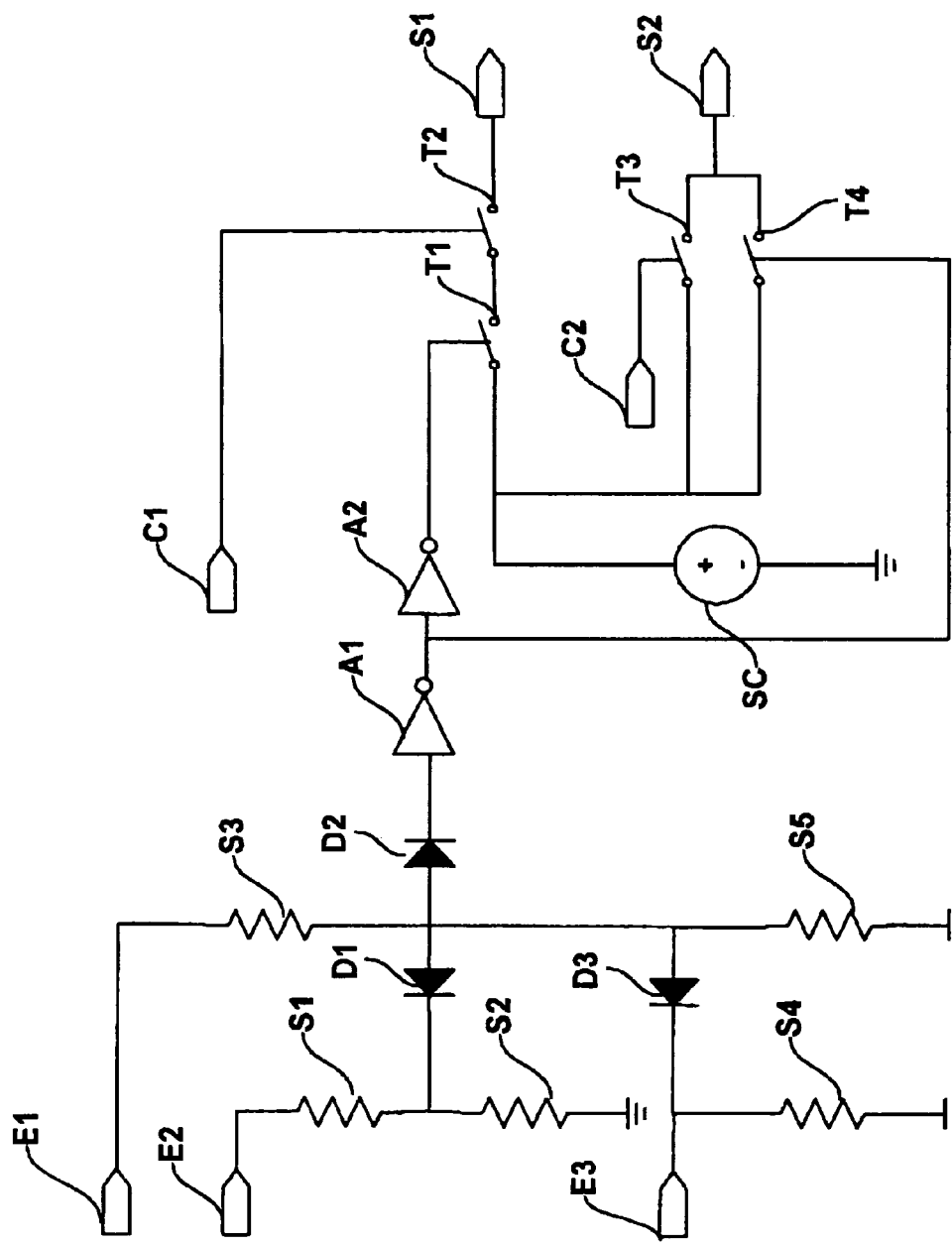
FIG. 6 represents a security subassembly of the system according to the invention.

According to an embodiment of the invention, the device interface means, in particular those designed to interface and control actuators, also comprise a security subassembly ensuring that predefined control signals are sent to the associated actuators in the event of failure or disabling by an external control signal. An exemplary embodiment of such a security subassembly is represented in FIG. 6. This subassembly comprises three input signals E1, E2, E3, two control signals C1, C2 and two output signals S1, S2. In normal operating mode, the state of the output S1 (respectively S2) is controlled by the control signal C1 (respectively C2) via the relay T2 (respectively T3). The assembly comprising the resistors S1 to S5, the diodes D1 to D2 and the inverters A1, A2 in series applies a logic function (in this example, this logic function is "E1 AND E2 AND E3") from one or more logic signals (in this case, the inputs E1, E2, E3). The signal from A2, resulting from this logic function, is used to control the relay T1 in series with the relay T2. The signal from A1 which represents a logical value that is the inverse of that of the signal from A2, controls the relay T4 in parallel with the relay T3. The state of the output S1 therefore depends on the state of the relays T1 and T2 and the state of the output S2 on the state of the relays T3 and T4. By these means, it is possible in this example to force the output S1 to the opened state (high impedance) and the output S2 to the closed state, powered by the direct current source SC when one of the three inputs E1 to E3 does not have its normal value. The normal value of E1 and of E3 is in this example a logic "1" represented by a voltage of 3.3 V whereas the normal voltage of E2 is a higher voltage equal to that of the direct current source SC connected upline of the relays T1, T3 and T4. Thus, by combining the control signals C1, C2 and the signal resulting from the logic function, it is possible via the relay stages T1, T2, T3, T4, to control the state of the outputs S1, S2. Such a security subassembly is obviously adapted according to the required actuator control application. Thus, the logic function can be adapted as required, the number of logic inputs modified and the number of power outputs increased or reduced, without the principles of this security subassembly being altered.

Figure 5:
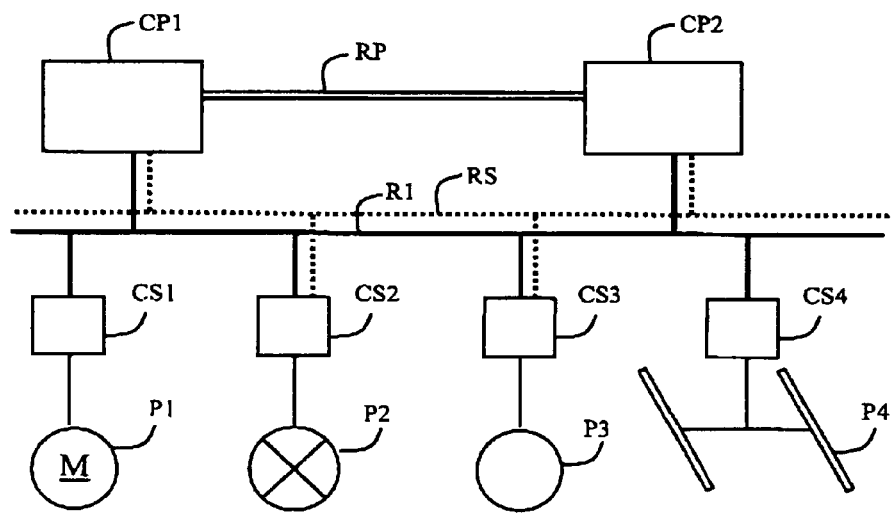
FIG. 5 diagrammatically represents a variant of the information exchange system according to the invention.

According to an advantageous embodiment of the invention, the network can be made redundant. Thus, FIG. 5 proposes a variant of the system of FIG. 2 in which the system comprises on the one hand a basic network R1 and on the other hand a backup network RS. Some peripheral devices, particularly those that are essential to the operation of the system will thus be connected to both of these networks. In this case, a data concentrator will have two independent communication channels and therefore two independent interfaces, each being linked to one of the two networks. Such redundancy enables the system to continue to function in the event of failure on one of the networks and therefore makes the invention compatible with the high security constraints to be observed in aircraft.

Independently of any redundancy of the network R1 with the backup network RS, it is possible to have the system computers intercommunicate via an additional network N, called a backbone network or main network, similar to that shown in FIG. 1 and used in the prior art. The result in this case is a configuration restoring the communication capabilities offered by such a main network, primarily dedicated to larger information or data transfers than those of the networks R1 or RS that will then be qualified as secondary networks.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. An information exchange system comprising:
at least one network for the transmission of information; at least one system computer accessing said at least one network;
at least two peripheral devices for exchanging said information with said at least one system computer, each of said at least two peripheral devices being a sensor or actuator and having no communication interface with said at least one network;
at least two data concentrators respectively associated with said at least two peripheral devices such that each peripheral device has its own data concentrator and each data concentrator is associated with only one peripheral device, said data concentrators accessing said at least one network and enabling said at least two associated peripheral devices to exchange said information with said at least one system computer, each of said data concentrators including,
a data processor;
a network interface accessing said at least one network and for interfacing said data processor and said at least one network; and
a device interface for interfacing said data processor and an associated peripheral device, said device interface including at least one basic device interface, combining of said basic device interface enabling said data concentrator to be interfaced with many types of peripheral devices;
said information exchange system further including a connection element for connecting a respective peripheral device to said device interface or said at least one network to said network interface;
said connection element including a connector, cable or connector accessory with a connector body, a respective one of said data concentrators being miniaturized and incorporated within the connector body so that said data concentrator is separable from said respective peripheral device by disconnection of said connection element, with the data concentrator incorporated within the connector body thereof, from said respective peripheral device said connection element further including an interconnection element between, on the one hand, said network interface and said device interface, and on the other hand, said at least one associated peripheral device and said at least one network;
said interconnection element including electrical contacts, and being configured to assign said electrical contacts and configure said data concentrator so as to enable said data concentrator to be interfaced with a peripheral device class, said electrical contacts being assigned by means of a passive matrix made up of conductive lines;
wherein said at least one network is configured to transmit said information by bearer currents, said network interface being configured to transmit information by bearer currents;
wherein said device interface includes a security subassembly that ensures that predefined control signals are sent to said at least one associated peripheral device in the event of failure or of reception of an external disabling signal.

2. The system claimed in claim 1, wherein said connection element is a connector or connector accessory for connecting said at least one associated peripheral device to said at least one network.

3. The system claimed in claim 1 wherein said connection element is a cable for connecting said at least one associated peripheral device to said at least one network.

4. The system claimed in claim 1, wherein, for said peripheral device class, the software configuration of the data processor is identical.

5. The system claimed in claim 1, wherein said interconnection element is also configured to identify said data concentrator vis-à-vis said at least one network.

6. The system claimed in claim 1, wherein the software configuration of said data processor is independent of the use of said information exchange system.

7. The system claimed in claim 1, wherein said at least one network is implemented according to CAN technology.

8. The system claimed in claim 1, wherein said at least one network is redundant and wherein at least one data concentrator includes more than one network interface for interfacing in a redundant way to said at least one network.

9. The system claimed in claim 1 and including a plurality of system computers, wherein said system computers are in communication with each other via a main network separate from said at least one network.

10. The system claimed in claim 1, wherein said device interface includes a toggle switch, a selector switch, a potentiometer or a motor.

11. The system claimed in claim 1, wherein said system is incorporated within an aircraft.

12. The system claimed in claim 1, wherein said system is incorporated within a vehicle.

13. A connection device for the exchange of information through at least one network between a system computer accessing said at least one network and at least one associated peripheral device having no communication interface with said at least one network, said at least one associated peripheral device being a sensor or actuator, said connection device comprising:

a data concentrator including, a data processor;

a network interface accessing said at least one network and interfacing said data processor and said at least one network; and a device interface for interfacing said data processor and said at least one associated peripheral device, said device interface including at least one basic device interface, combining of said basic device interface enabling said data concentrator to be interfaced with many types of peripheral devices;

said data concentrator being associated with only one peripheral device;

a connection element for connecting said at least one associated peripheral device to said device interface or said at least one network to said network interface, said connection element including a connector, cable or connector accessory with a connector body, said data concentrator being miniaturized and incorporated within the connector body so that said data concentrator is separable from said at least one associated peripheral device by disconnection of said connection element, with the data concentrator incorporated within the connector body thereof, from said at least one associated peripheral device;

said connection element including an interconnection element between, on the one hand, said network interface and said device interface, and on the other hand, said at least one associated peripheral device and said at least one network, said interconnection element including electrical contacts and being configured to assign said electrical contacts and to configure said data concentrator so as to enable said data concentrator to be interfaced with a peripheral device class, said electrical contacts being assigned by means of a passive matrix made up of conductive lines;

wherein the device interface and said network interface are designed for the transmission of information by bearer currents;

wherein said device interface includes a security subassembly ensuring that predefined control signals are sent to said at least one associated peripheral device in the event of failure or of reception of an external disabling signal.

14. The connection device claimed in claim 13, wherein said connection element is a connector or connector accessory for connecting said at least one associated peripheral device to said at least one network.

15. The connection device claimed in claim 13 wherein said connection element is a cable for the connection of said at least one associated peripheral device to said at least one network.

16. The connection device claimed in claim 13, wherein said interconnection element is also configured to identify said data concentrator in relation to said at least one network.

17. The connection device claimed in claim 13, wherein, for said peripheral device class, the software configuration of the data processor is identical.

18. The connection device claimed in claim 13, wherein said data processor has a software configuration independent of the use of said information exchange system.

19. The connection device claimed in claim 13, wherein said at least one network is redundant and said data concentrator includes at least two network interfaces for interfacing said at least one network in a redundant way.

* * * * *